(12) United States Patent
Marques et al.

(10) Patent No.: US 8,656,832 B2
(45) Date of Patent: Feb. 25, 2014

(54) ROUND BALER HAVING LATERAL GUIDES FOR THE COMPRESSION BELT

(75) Inventors: Manuel Marques, Vernotte (FR); David Beaufort, Arc les Gray (FR); Sébastien Guerin, Bar sur Aube (FR)

(73) Assignee: Deere & Company, Moline, IL (US)

( * ) Notice: Subject to any disclaimer, the term of this patent is extended or adjusted under 35 U.S.C. 154(b) by 32 days.

(21) Appl. No.: 13/366,472

(22) Filed: Feb. 6, 2012

(65) Prior Publication Data
US 2013/0032047 A1    Feb. 7, 2013

(30) Foreign Application Priority Data
Feb. 7, 2011    (DE) .......................... 10 2011 003 727

(51) Int. Cl.
*A01F 15/18*    (2006.01)
*B65G 39/16*    (2006.01)

(52) U.S. Cl.
CPC ................. *A01F 15/18* (2013.01); *B65G 39/16* (2013.01)
USPC .......................................................... 100/88

(58) Field of Classification Search
USPC ......... 100/87, 88; 56/341; 198/837, 840, 842; 242/615.2
See application file for complete search history.

(56) References Cited

U.S. PATENT DOCUMENTS

| 3,687,273 A * | 8/1972 | Macone et al. ............... 198/806 |
| 3,692,674 A | 9/1972 | Wood |
| 3,927,814 A | 12/1975 | Holm |
| 3,992,987 A | 11/1976 | Sereg |
| 5,097,760 A * | 3/1992 | Ratzlaff et al. ................. 100/88 |
| 5,219,063 A | 6/1993 | Wyatt |
| 5,261,323 A | 11/1993 | Gunther et al. |
| 5,941,168 A | 8/1999 | Kluver et al. |
| 7,114,435 B2 * | 10/2006 | Viaud et al. ..................... 100/88 |
| 7,815,042 B2 * | 10/2010 | Oishi ............................ 198/837 |

FOREIGN PATENT DOCUMENTS

| DE | 528450 | 6/1931 |
| EP | 1308078 | 5/2003 |
| EP | 2392206 | 12/2011 |

OTHER PUBLICATIONS

European Search Report, May 29, 2012, 4 pages.

* cited by examiner

*Primary Examiner* — Jimmy T Nguyen
(74) *Attorney, Agent, or Firm* — Quarles & Brady LLP

(57) ABSTRACT

A round baler comprises a baling chamber which is surrounded by compression elements in the form of a single compression belt or a plurality of compression belts, the adjacent edges of which butt directly against one another. The compression elements rest on a drivable roll and freely running rolls and is guided laterally through lateral guides in the axial direction of at least one of the rolls. The lateral guides are arranged on both sides of the compression elements immediately upstream of a drivable roll with regard to the direction of movement of the compression elements which applies during the baling operation. They consist of discs which rotate in the plane of the compression elements, the discs having grooves into which the compression elements extends.

5 Claims, 2 Drawing Sheets

ROUND BALER HAVING LATERAL GUIDES FOR THE COMPRESSION BELT

FIELD OF THE INVENTION

The invention relates to a round baler having a baling chamber which is surrounded by a compression elements in the form of a single compression belt or a plurality of compression belts. The adjacent edges of the belt or belts butt directly against one another. The compression elements rests on a drivable roll and freely running rolls and can be guided laterally through lateral guides in the axial direction of at least one of the rolls.

BACKGROUND OF THE INVENTION

Round balers are used in order to produce bales from stalk-like harvested crops and have a baling chamber and compression elements surrounding the latter. The compression elements are usually configured as rolls or as endless traction elements in the form of chains having transverse elements or belts secured thereto. Such belts are used in particular in round balers having an variable bale diameter and rest on rolls, some of which are supported on the frame of the round baler and others of which can move with respect to the frame, in order to adapt the baling chamber to the gradually growing bale and to enable ejection of a finished bale.

The rolls, some of which are driven and others of which are freely running, extend transversely to the forward direction and the axis of the bale. Usually, a number of narrower compression belts are distributed over the width of the baling chamber or a single, wide compression belt is used (see e.g. U.S. Pat. No. 5,941,168 A1, which is considered to define the generic type). Since irregular distribution of harvested crop over the width of the baling chamber or displacement of the harvested crop to one side when work is carried out on a slope can lead to lateral displacement of the compression belt, and thus can result in undesired rubbing of the compression belt against the side wall of the round baler, guides for the compression belts have been proposed, these guides consist of rigid elements on which the compression belt rests laterally (see U.S. Pat. No. 5,261,323 A1). It has also been proposed to attach radially protruding rings on one of the rolls, so that the individual compression belts run through in each case between two rings (see U.S. Pat. No. 3,992,987 A1).

DE 528 450 C shows a belt conveyor which forms a reversing loop and the belt of which is guided in the lateral direction by freely rotatable discs which are located in the belt plane and butt against the edge of the belt. The subsequently published European Patent Application 10164609.9 describes a baler having a rear door which can be pivoted open and to which there are secured opposing guide rolls which enclose between one another a compression belt that extends over the width of the baling chamber.

SUMMARY OF THE INVENTION

The problem underlying the invention is considered to be that of providing a round baler having improved lateral guidance of the compression belt.

A round baler comprises a baling chamber which is surrounded by a compression elements in the form of a single compression belt or a plurality of compression belts, the adjacent edges of which butt directly against one another. The compression elements rests on a (or a plurality of) drivable roll(s) and freely running rolls. It is guided laterally through lateral guides in the axial direction of at least one of the rolls.

The lateral guides are arranged immediately upstream of a drivable roll with regard to the direction of movement of the compression elements which applies during the baling operation. A guide is located on each side of the compression elements. The lateral guides consist of discs which rotate freely in the local plane of the compression elements, the discs having grooves into which the compression elements extends.

Since the compression elements consists of a single compression belt or a plurality of compression belts which are arranged immediately adjacent to one another, it is sufficient to guide it only at its two sides. This guidance takes place in a very low-friction manner by way of the discs which run freely in the plane of the compression elements and have a groove into which the compression elements extends. Accordingly, it is guided not only in the lateral direction, but also in the direction orthogonally thereto. Immediately downstream of the discs, there follows a driven roll, which drives the compression elements in its longitudinal direction. Since the discs correctly center the compression elements in the axial direction of the driven roll, the entire compression elements always rests on the driven roll. As a result, transmission of force without problems is possible and the situation is avoided of undesired shear forces acting on those regions of the compression elements that do not run over the roll and reducing the service life of the compression elements.

In this way, a long service life of the compression elements is achieved, and undesired friction between moving and non-moving parts of the round baler is prevented.

Further guides of this type for the compression elements, having grooved discs, can additionally be fitted at any other desired locations in the round baler. The compression elements can additionally be guided laterally by rings, which are fitted on driven or non-driven rolls for deflecting the compression elements and butt laterally against the compression elements.

BRIEF DESCRIPTION OF THE DRAWINGS

An exemplary embodiment of the invention, which is described in more detail in the following text, is illustrated in the drawings, wherein.

DESCRIPTION OF THE PREFERRED EMBODIMENT

Figure 1:
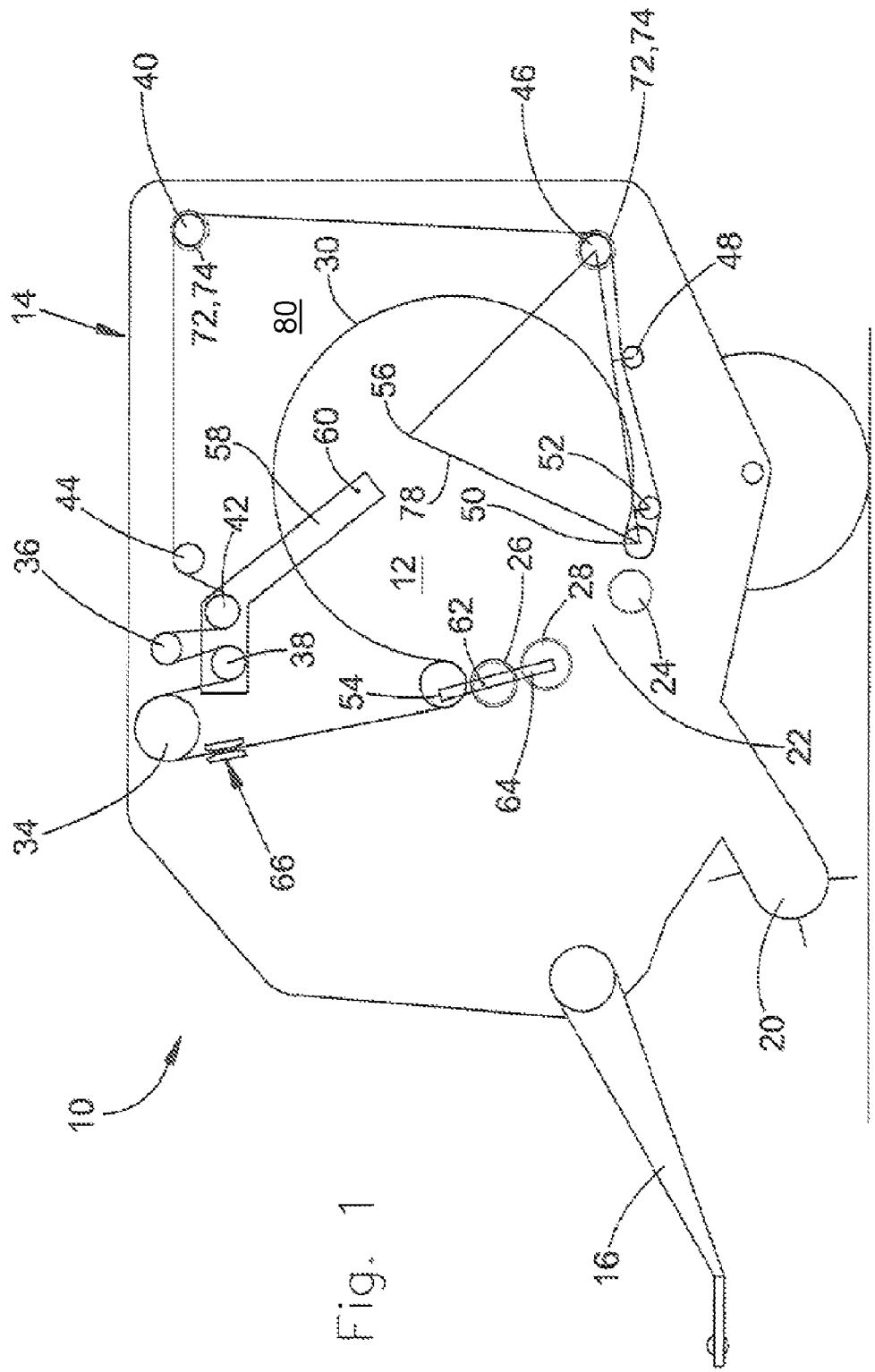
FIG. 1 is a side view and schematic illustration of a round baler according to the invention in an almost filled operating state.

FIG. 1 illustrates an embodiment of a round baler 10, which has a frame 14, which is supported on an undercarriage. On the front side of the frame 14 there is arranged a drawbar 16 in order to be able to attach the round baler 10 to a tractor and to pull it over a field. A collecting apparatus 20 in the form of a pick-up serves to pick up harvested crop lying on the ground, e.g. hay or straw deposited in a swath. The harvested crop picked up by the collecting apparatus 20 is supplied to the inlet of a baling chamber 12 and rolled up there in a spiral shape to form a round cylindrical bale, tied and subsequently deposited on the ground.

Positioned at the inlet 22 of the baling chamber 20 are a lower, stationary roller 24 and two upper rollers 26, 28. The baling chamber 12 is further formed by endless compression elements 30 in the form of two compression belts 32, which butt directly against one another laterally (FIG. 2), and are guided around a number of positionally fixed rolls 34, 36, 40, 44 and movable rolls 38, 42, 46, 48, 50, 52. While the baling chamber 12 is peripherally surrounded substantially by the compression elements 30 and the rollers 24 to 28, it is closed laterally by side walls 80.

Four of the movable rolls 46 to 52 are mounted in a freely rotatable manner at the lower end of a delta-shaped support 78, which is articulated in a pivotable manner by way of its upper tip about an axis 56 extending horizontally and transversely to the forward direction and can be moved by an actuator (not shown) from the baling position illustrated in FIG. 1 into a rearwardly and upwardly pivoted bale-ejecting position.

A tensioning mechanism for tautening the compression elements 30 comprises a tensioning arm 58, two rolls 38, 42, which are arranged in a movable manner at the radially outer end region of the tensioning arm, and a tensioning element (not shown). The tensioning arm 58 is mounted in a mount 60 in the region of the side walls 80 above and in front of the rotational axis 56 such that it can be pivoted about an axis extending horizontally and transversely to the forward direction, and extends as far as just below the plane in which the positionally fixed upper rolls 34, 36, 44 are arranged. The tensioning element is formed usually as a mechanical spring or as a hydraulic motor.

The upper rollers 26, 28 and the roll 54 are secured to a pivotable pivoting frame 64 which is mounted in its central region about a pivot axis 62 extending horizontally and transversely to the forward direction. The roll 54 and the rollers 26, 28 are mounted in a freely rotatable manner in the pivoting frame 64, with the roller 26 running coaxially with the pivot axis 62. The pivoting frame 64 can be pre-tensioned into a particular position by means of a tensioning element (not shown).

The compression elements 30 is constantly pressed firmly by tensioning arm 58 against the positionally fixed roll 34, which is driven in rotation, as to ensure that the compression elements is carried along. The roll 54, is also driven in rotation. The compression elements 30 takes up an initial state, in which it is stretched out straight and bridges the inlet 22, and an end state, in which it loops around the bale 36 like a large loop, as is shown for instance in FIG. 1. The size of the baling chamber 12 can thus be changed, i.e. its diameter increases with the size of the bale. While it is being formed, the bale is located in the baling chamber 12 and largely looped around by the compression elements 30, but drops out of the back of the baling chamber 12 and onto the ground as soon as the support 78 pivots upwards in the counter-clockwise direction, with regard to the drawing, by way of the moving rolls 46 to 52.

The illustrated embodiment of the baler is disclosed in detail in EP 1 308 078 A1. Other, possible embodiments are described in DE 198 51 470 A1, DE 102 41 215 A1 and EP 1 264 531 A1. The disclosure contents of these documents are incorporated into the present document by reference.

Figure 2:
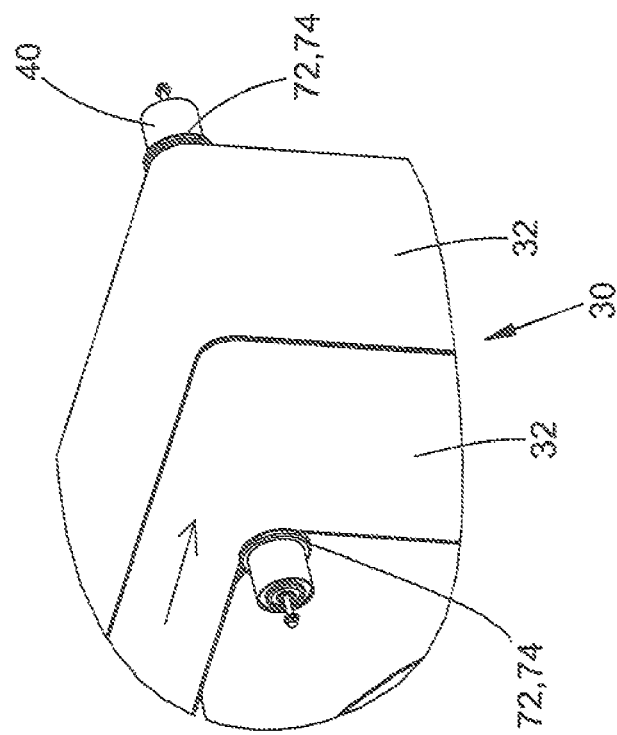
FIG. 2 is a perspective view of the driven roll of the round baler with lateral guidance of the compression elements; and, FIG. 3 is a perspective view of a non-driven roll of the round baler, having rings for the lateral guidance of the compression elements.
Figure 3:
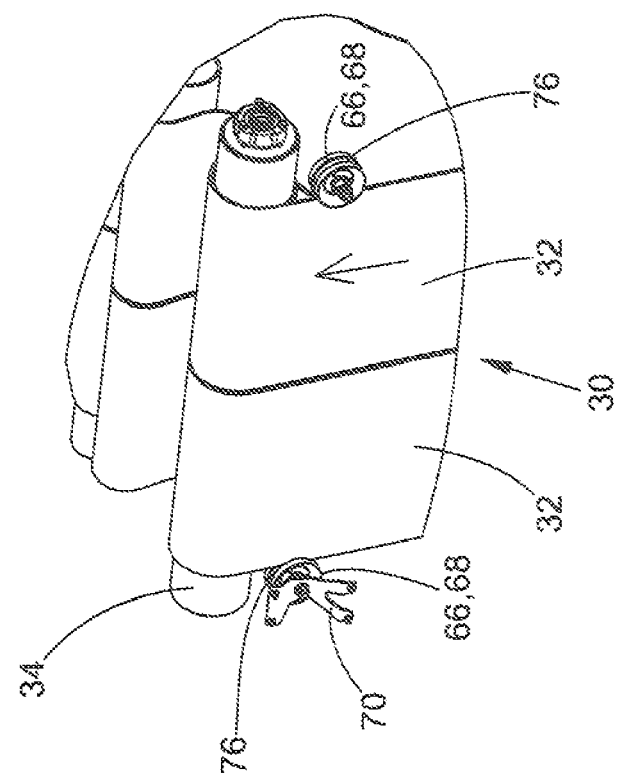

First guides 66 serve to guide the compression elements 30 laterally, the first guides 66 being located, during baling, directly upstream of the driven roll 34 with regard to the direction of movement of the compression elements 30, indicated by the arrows in FIG. 2. The first guides 66 consist of discs 68, which are provided with central grooves 76, are located in the present plane of the compression elements 30 and are mounted such as to be freely rotatable about their central axes. The compression elements 30 extends into the groove in the discs 68 and is thus also guided transversely to its direction of movement. The discs 68 are secured to the frame 12 by holders 70 and can be adjusted to a certain degree in the lateral direction, e.g. by way of slots.

Mounted on the freely running rolls 40 and 46 are protruding rings 72, between which the compression elements 30 runs through, and which serve as second guides 74, through which the compression elements 30 is guided in the lateral direction.

The guides 66, 74 are each positioned upstream of relatively long portions of the compression elements 30, so that the latter is guided sufficiently in the lateral direction over its entire length and is directed centrally over the positionally fixed rolls 34, 36, 40, 44, 54 and the movable rolls 38, 42, 46, 48, 50, 52.

Having described the preferred embodiment, it will become apparent that various modifications can be made without departing from the scope of the invention as defined in the accompanying claims.

The invention claimed is:

1. A round baler comprising:
a baling chamber which is surrounded by compression elements in the form of one of a single compression belt and a plurality of compression belts, adjacent edges of the plurality of compression belts butt directly against one another, wherein the compression elements rest on a drivable roll and freely running rolls and are guided laterally through lateral guides in an axial direction of at least one of the rolls;
wherein the lateral guides are arranged on both sides of the compression elements immediately upstream of the drivable roll with regard to a direction of movement of the compression elements during baling operation, and the lateral guides are constructed from discs which rotate in a plane of the compression elements, the discs having grooves into which the compression elements extends, and
wherein one or more of the freely running rolls are equipped with protruding rings, guiding the compression elements, the rings being adjustable in an axial direction of the freely running rolls.

2. A round baler according to claim 1, wherein the baler further comprises:
a support which is pivotable between a baling position on the underside of the baling chamber and a bale-ejecting position at the rear of and above the baling chamber, wherein the support is provided with freely running rolls, of which one roll is equipped with rings guiding the compression elements.

3. A round baler according to claim 1, wherein the discs are adjustable in the lateral direction of the compression elements.

4. A round baler according to claim 1, wherein the lateral guides are further arranged on a substantially vertical portion of the compression elements.

5. A round baler according to claim 1, wherein the lateral guides are arranged downstream of a pivoting frame with regard to the direction of movement of the compression elements during the baling operation, the pivoting frame supporting at least one roll,
and wherein the compression elements are unsupported by rollers between the at least one roll supported by the pivoting frame and the lateral guides.

* * * * *